R. LIEBAU.
AIR SPRING SUSPENSION.
APPLICATION FILED FEB. 26, 1919.
1,368,563.
Patented Feb. 15, 1921.
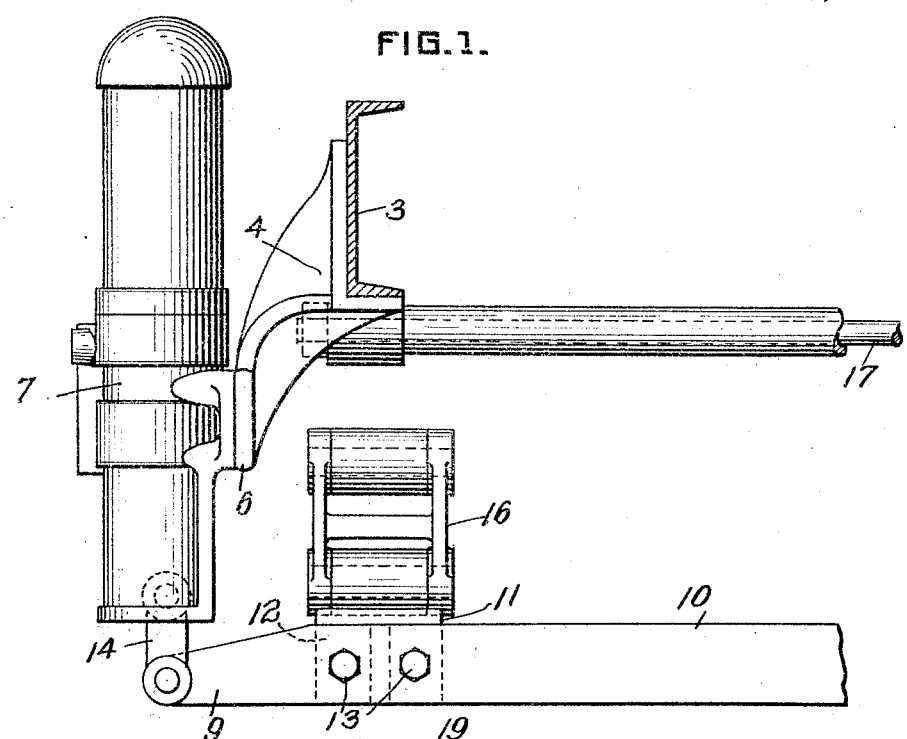
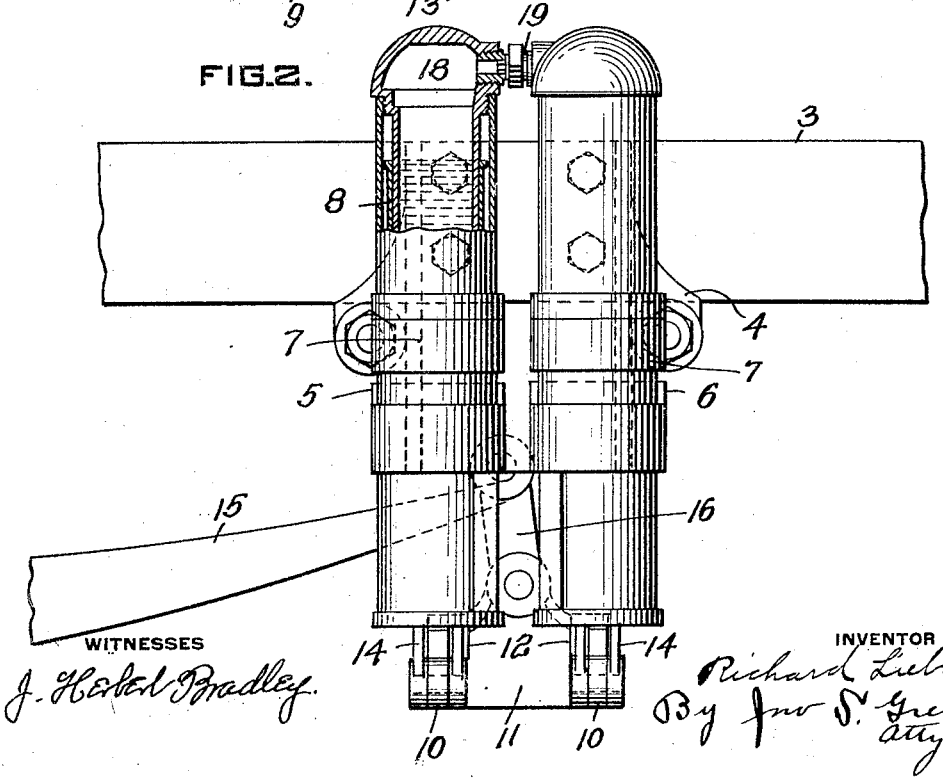
WITNESSES
J. Herbert Bradley.
INVENTOR
Richard Liebau
By Jno S. Green
atty.

UNITED STATES PATENT OFFICE.

RICHARD LIEBAU, OF NEW HAVEN, CONNECTICUT, ASSIGNOR TO THE WESTINGHOUSE AIR SPRING COMPANY, A CORPORATION OF PENNSYLVANIA.

AIR-SPRING SUSPENSION.

1,368,563.     Specification of Letters Patent.     Patented Feb. 15, 1921.

Application filed February 26, 1919. Serial No. 279,432.

*To all whom it may concern:*

Be it known that I, RICHARD LIEBAU, a citizen of the United States, and a resident of New Haven, in the county of New Haven and State of Connecticut, have made a new and useful Invention in Air-Spring Suspensions, of which the following is a specification.

This invention relates to vehicle air springs.

It is some times found desirable to utilize two relatively small air springs in place of a larger air spring for supporting one corner of the load platform of a vehicle and an object of this invention is to provide mounting means for air springs used in multiple in place of a single air spring of large size.

In the drawings accompanying and forming a part of this application, Figure 1 is a view in end elevation of a device embodying this invention and Fig. 2 is a view in side elevation of said device.

3 represents one side member of the frame of the load platform of a vehicle such as a motor truck and to the outside of said frame a bracket 4 is bolted. This bracket is provided with two pads or facings 5 and 6 to each of which a stationary member 7 of an air spring preferably of the Westinghouse type is secured. The movable element 8 of each air spring is provided with a bottom member as is now common and each bottom member is connected to the outer end 9 of a cross member made up of parallel bars 10 secured together adjacent their ends by means of a yoke 11. Yoke 11 has two depending channel shaped feet 12 to which the cross elements 10 are bolted as shown at 13. The end shackle 9 of each cross element is preferably shackled to the adjacent cylinder bottom by means of a shackle link 14.

Yoke 11 is connected to the adjacent end of steel 15 of the vehicle by means of shackle 16. Tie rods 17 connect bracket 4 on one side of the vehicle to a similar bracket on the opposite side. These tie rods are utilized for the purpose of preventing undue twisting strains to the side member 3 of the load platform. The cushion chambers 18 of each pair of air springs on one corner of the vehicle are preferably connected together by means of a connecting pipe 19 so that the springs constituting a pair will operate in unison.

Having thus described my invention what I claim is—

1. The combination with a load platform and steel springs of a vehicle, of an air spring secured to one side of said platform, a member extending across the vehicle from side to side below said steel springs, means for securing said member to said springs, and means for securing the outer end of said member to said air spring.

2. In combination with the load platform and steel springs of a vehicle, a pair of air springs located outside of said load platform, a cross member extending across the vehicle below the end of said steel springs, means for securing the outer end of each air spring to said member, and means for connecting said cross member to said steel spring.

3. The combination with a load platform and steel springs of a vehicle, of air springs secured to opposite sides of said platform, a member extending across the vehicle from side to side below said steel springs, shackles for connecting said member to said steel springs, and shackles connecting the outer ends of said member to said air springs.

4. The combination with a load platform and steel springs of a vehicle, of air springs secured to opposite sides of said platform, a bar extending across the vehicle below said steel springs, shackles connecting said bar to said steel springs, and means for securing the outer end of said bar to said air springs.

5. The combination with a load platform and leaf springs of a vehicle, of two pairs of air springs secured to opposite sides of said platform, means interconnecting the air space of each pair, a bar extending across the vehicle from side to side below said leaf springs, means connecting said bar to said leaf springs, and means connecting the outer ends of said bar to said air springs.

In testimony whereof, I have hereunto subscribed my name this 2nd day of December, 1918.

RICHARD LIEBAU.